United States Patent
Li et al.

(10) Patent No.: US 12,542,582 B2
(45) Date of Patent: Feb. 3, 2026

(54) RECONFIGURABLE INTELLIGENT SURFACE

(71) Applicant: NTT DOCOMO, INC., Tokyo (JP)

(72) Inventors: Xiang Li, Beijing (CN); Xin Wang, Beijing (CN); Xiaolin Hou, Beijing (CN); Lan Chen, Beijing (CN); Satoshi Suyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 144 days.

(21) Appl. No.: 18/567,648

(22) PCT Filed: Jul. 22, 2021

(86) PCT No.: PCT/CN2021/107871
§ 371 (c)(1),
(2) Date: Dec. 6, 2023

(87) PCT Pub. No.: WO2023/000260
PCT Pub. Date: Jan. 26, 2023

(65) Prior Publication Data
US 2024/0283498 A1    Aug. 22, 2024

(51) Int. Cl.
*H04B 7/0456* (2017.01)
*H04W 16/26* (2009.01)

(52) U.S. Cl.
CPC .......... *H04B 7/0456* (2013.01); *H04W 16/26* (2013.01)

(58) Field of Classification Search
CPC .. H04B 7/0456; H04B 7/0617; H04B 7/0695; H04W 16/26; H01Q 3/30
See application file for complete search history.

(56) References Cited

U.S. PATENT DOCUMENTS

| | | | |
|---|---|---|---|
| 2018/0198511 A1* | 7/2018 | Maamari | H04B 7/0626 |
| 2023/0041198 A1* | 2/2023 | Chen | H04B 7/0691 |
| 2023/0318177 A1* | 10/2023 | Zhou | H04L 25/0204 455/456.1 |

* cited by examiner

Primary Examiner — Vineeta S Panwalkar
(74) Attorney, Agent, or Firm — Osha Bergman Watanabe & Burton LLP

(57) ABSTRACT

The present disclosure provides a reconfigurable intelligent surface, including: a receiving unit which receives subarray division setting information sent from a base station; a reconfigurable panel; and a processing unit, which divides, based on the subarray division setting information, the reconfigurable panel into M subarrays, where M is a positive integer greater than 1, wherein, the subarray division setting information is determined based on a distance between a target device and the reconfigurable panel, N subarrays of the M subarrays serve one target device, and N is a positive integer greater than 1 and less than or equal to M.

9 Claims, 9 Drawing Sheets

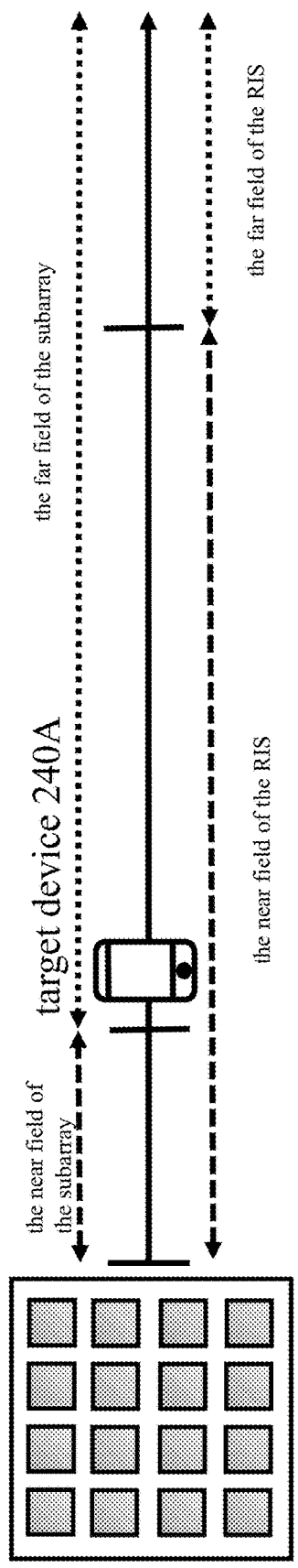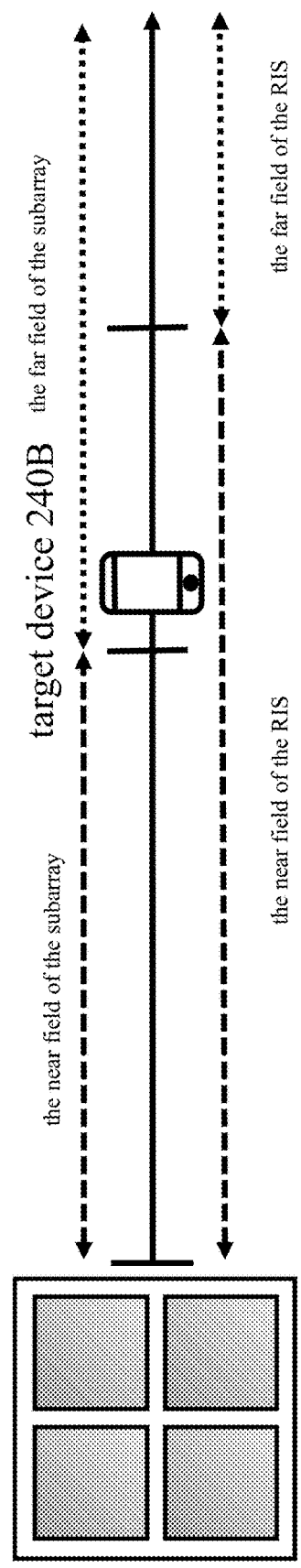
FIG. 2A
FIG. 2B

| the maximum number of array elements | subarray size (communication frequency of 30GHz) | the distance between the target device and the RIS panel (communication frequency of 30GHz, $\alpha=1$) |
|---|---|---|
| 32 x 32 | 16cm x 16cm | $\geq 2.5m$ |
| 64 x 64 | 32cm x 32cm | $\geq 10m$ |
| 128 x 128 | 64cm x 64cm | $\geq 40m$ |
| 256 x 256 | 1.3m x 1.3m | $\geq 160m$ | an example of values of the subarray size and the distance from the target device to the RIS panel

FIG. 3

RECONFIGURABLE INTELLIGENT SURFACE

TECHNICAL FIELD

The present disclosure relates to a reconfigurable intelligent surface in next-generation mobile communication systems.

BACKGROUND

Communication systems such as 5G and 6G will use millimeter wave frequency bands and higher frequency bands for communication to increase wireless data transmission rates. However, the coverage of a wireless communication system using millimeter wave frequency bands and higher frequency bands is small. For this reason, a scheme of using a Reconfigurable Intelligent Surface (RIS) including a Reconfigurable Panel to increase the coverage of the communication system is proposed.

The Reconfigurable Intelligent Surface has the characteristics of low cost and low power consumption, which provide new possibilities for solving the coverage and capacity problems of mobile communication systems.

Since the larger the area of the RIS panel, the greater the gain it can provide. Therefore, considering the path loss from the base station (BS) to the RIS and the path loss from the RIS to the user terminal (UE), a larger area RIS panel is usually required to provide sufficient gain to compensate for the path loss of the BS-RIS-UE cascade channel.

However, a large-sized RIS panel will bring problems with large near field range. For example, the near field range of a 1 m by 1 m RIS panel operating in the millimeter wave frequency band is approximately 100 meters. Therefore, a large number of users may be within the near field range of the RIS. However, the traditional beamforming (BF) method based on discrete fourier transform (DFT) is designed for the far field, and the gain in the near field is low.

In order to improve the near field gain of the large-sized RIS, beamforming technology suitable for communication is required. For example, coherent BF technology can be used for beamforming. In the coherent BF technology, by independently compensating the phase of the channel of each array element of the RIS, the reflected/transmitted signals are superimposed in the same phase at the user. However, coherent BF technology requires complete channel state information (CSI). Obtaining complete channel state information in RIS scenarios is extremely difficult and lacks practicality.

As another example, focusing BF technology can also be used to perform beamforming. In the focusing BF technology, based on the user's accurate position, the phase of the array element of the RIS is adjusted one by one to achieve focusing of the reflected signal or transmitted signal at the user. However, this technology requires RIS to precisely control each array element, which is highly complex.

SUMMARY

It is hoped to provide a new reconfigurable intelligent surface to improve the problem of large near field range and low gain in the near field range of large-sized RIS.

According to an aspect of the present disclosure, a reconfigurable intelligent surface is provided, comprising: a receiving unit which receives subarray division setting information sent from a base station; a reconfigurable panel; and a processing unit, which divides, based on the subarray division setting information, the reconfigurable panel into M subarrays, where M is a positive integer greater than 1, wherein, the subarray division setting information is determined based on a distance between a target device and the reconfigurable panel, N subarrays of the M subarrays serve one target device, and N is a positive integer greater than 1 and less than or equal to M.

According to an aspect of the present disclosure, each of the M subarrays corresponds to a specific beam respectively.

According to an aspect of the present disclosure, the specific beam of each of the N subarrays in the M subarrays is converged on the one target device.

According to an aspect of the present disclosure, the specific beam of each of the N subarrays in the M subarrays is dispersed within a specific range relative to the one target device.

According to an aspect of the present disclosure, the M subarrays serve multiple target devices, a number of subarrays serving each of the target devices is a positive integer, and the number of subarrays is greater than 1 and less than or equal to M.

According to an aspect of the present disclosure, a reconfigurable intelligent surface is provided, comprising: a receiving unit configured to receive position information of a target device; a reconfigurable panel; and a processing unit configured to determine a first codebook based on a direction of the reconfigurable panel relative to the target device, and perform calculation on the first codebook based on a distance between the reconfigurable panel and the target device and a position of each subarray in M subarrays included in the reconfigurable panel to determine a second codebook, wherein, the M is a positive integer greater than 1

According to an aspect of the present disclosure, each of the subarrays comprises multiple array elements, the second codebook comprises an array element deflection sub-codebook and a phase compensation sub-codebook, the array element deflection sub-codebook performs deflection on each array element in the subarray respectively, the phase compensation sub-codebook performs phase compensation on the subarray.

According to an aspect of the present disclosure, the reconfigurable intelligent surface determines a first beam of each subarray through the first codebook, and performs the deflection and the phase compensation on the first beam through the second codebook.

According to an aspect of the present disclosure, the target device comprises at least one of a terminal and a base station.

According to one aspect of the present disclosure, the reconfigurable intelligent surface oversamples the first codebook and the second codebook.

BRIEF DESCRIPTION OF DRAWINGS

The above and other objects, features and advantages of the present disclosure will become more apparent by describing embodiments of the present disclosure in more detail in conjunction with the accompanying drawings. The drawings are used to provide a further understanding of the embodiments of the present disclosure, and constitute a part of the specification. They are used to explain the present disclosure together with the embodiments of the present disclosure, and do not constitute a limitation of the present disclosure. In the drawings, like reference numbers generally represent like components or steps.

FIGS. 2A and 2B are schematic diagrams illustrating the relationship between near field influence and subarray division of the reconfigurable panel according to an embodiment of the present disclosure.

FIG. 3 is a diagram illustrating examples of values of the subarray size and the distance from the target device to the reconfigurable panel according to an embodiment of the present disclosure.

DETAILED DESCRIPTION

Figure 1:
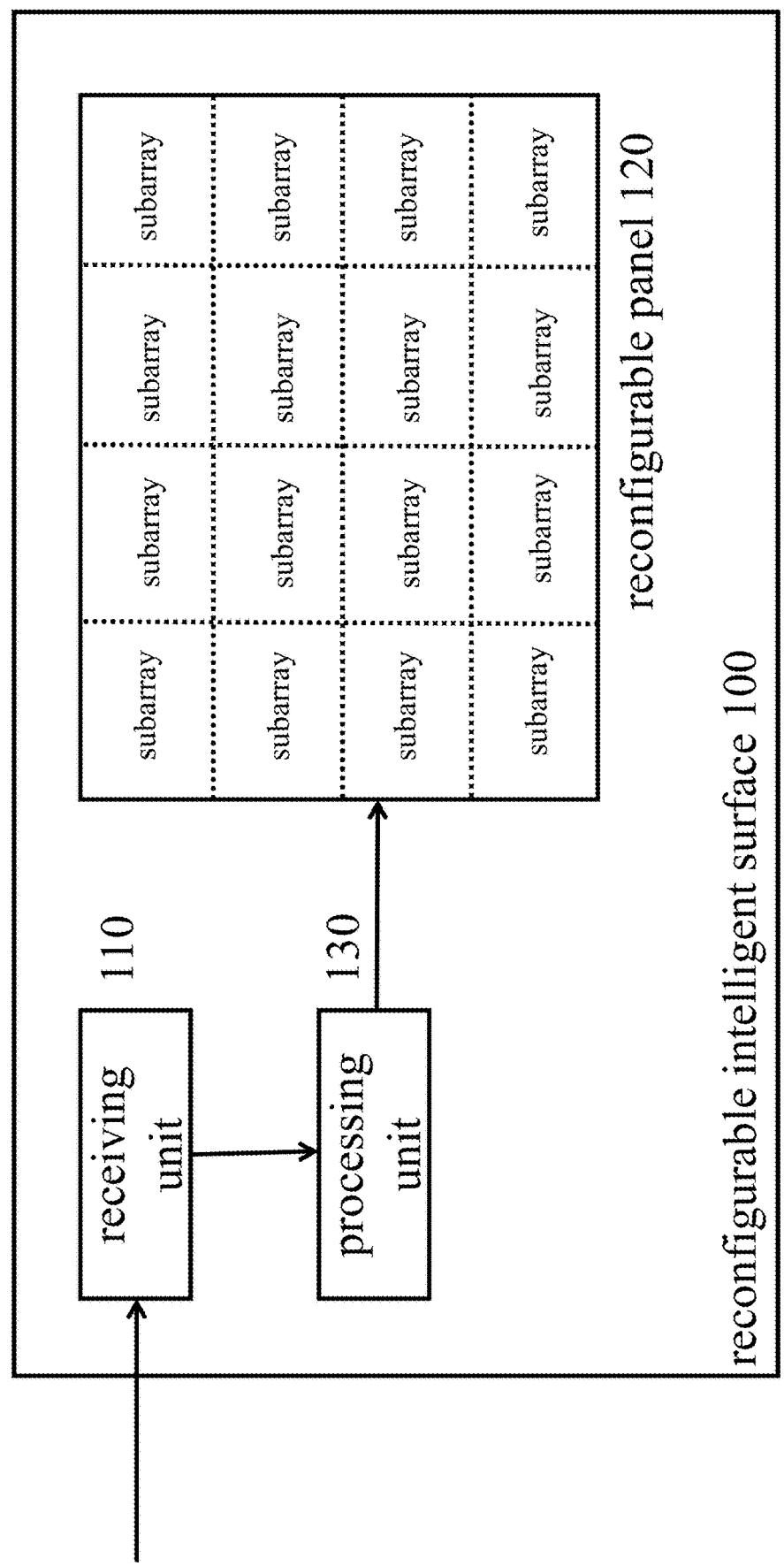
FIG. 1 is a schematic diagram illustrating a reconfigurable intelligent surface according to an embodiment of the present disclosure.

In order to make the objects, technical solutions and advantages of the present disclosure more apparent, example embodiments according to the present disclosure will be described in detail below with reference to the accompanying drawings. In the drawings, like reference numbers refer to like elements throughout. It should be understood that the embodiments described in the present disclosure are illustrative only and should not be construed as limiting the scope of the present disclosure. In addition, the terminal described in the present disclosure may include various types of terminals, such as a vehicle terminal, a user equipment (UES), a mobile terminal (or mobile station), or a fixed terminal. The base station (BS) described in the present disclosure includes various types of base stations, such as a wireless base station, a fixed station, a NodeB, an eNodeB (eNB), a gNodeB (gNB), an access point, a transmission point (TP), a reception point (RP), a transmission and reception point (TRP), etc. In the present disclosure, a reconfigurable intelligent surface (RIS) may also be called a reconfigurable panel, RIS panel, large intelligent surface, passive intelligent surface, reconfigurable metasurface, software defined surface, software defined metasurface, large intelligent metasurface, smart reflect array, and so on, depending on the specific situation.

A reconfigurable intelligent surface 100 according to an embodiment of the present disclosure will be described with reference to FIG. 1. FIG. 1 is a schematic diagram illustrating a reconfigurable intelligent surface according to an embodiment of the present disclosure. As shown in FIG. 1, the reconfigurable intelligent surface 100 includes a receiving unit 110, a reconfigurable panel 120, and a processing unit 130. In the embodiment according to the present disclosure, the reconfigurable panel 120 may be located within the same housing as the processing unit 130. Alternatively, the reconfigurable panel 120 may also be provided independently of the processing unit 130.

Specifically, in the example illustrated in FIG. 1, the receiving unit 110 receives the subarray division setting information sent from the base station. For example, the subarray division setting information may be determined based on the distance between the target device and the reconfigurable panel 120. Additionally, the specific target device can be identified as needed. For example, the target device may include one of a terminal and a base station. The target device can be one device or multiple devices. For example, when the target device is a terminal device, the target device may be a terminal device closer to the reconfigurable intelligent surface 100, or the target device may be multiple terminal devices closer to the reconfigurable intelligent surface 100.

The processing unit 130 divides the reconfigurable panel 120 into M subarrays based on the subarray division setting information, where M is a positive integer greater than 1. In an example according to the present disclosure, N subarrays of M subarrays serve one of the target devices, where N is a positive integer greater than 1 and less than or equal to M. In other words, when it is desired to use the reconfigurable intelligent surface 100, the reconfigurable panel 120 may be divided into multiple subarrays based on the subarray division setting information indicating the distance between the target device and the reconfigurable panel 120. In addition, in an embodiment according to the present disclosure, other factors, such as hardware constraints, may also be considered when dividing the reconfigurable panel 120 into multiple subarrays. Since the area of a reconfigurable panel is related to its gain. As the area of the reconfigurable panel increases, the gain of the reconfigurable panel also increases. Correspondingly, the near field range of the reconfigurable panel also increases due to the increase in area, and the near field impact on the target device also increases more significant. On the contrary, as the area of the reconfigurable panel decreases, the gain of the reconfigurable panel also decreases. Correspondingly, the near field range of the reconfigurable panel also becomes smaller due to the decrease in area, and the near field impact on the target device is mitigated.

Therefore, according to an example of the present disclosure, for a target device with a larger distance from the reconfigurable panel 120 as indicated by the subarray division setting information, the processing unit 130 may divide the reconfigurable panel 120 into fewer subarrays, so that each subarray can have a larger area. Since the distance between the target device and the reconfigurable panel 120 is large, even a subarray with a large area will not cause significant near field effect on the target device. For the target device with a smaller distance from the reconfigurable panel 120 as indicated by the subarray division setting information, the processing unit 130 can divide the reconfigurable panel 120 into more subarrays, so that each subarray can has a smaller area. Since the distance between the target device and the reconfigurable panel 120 is smaller, a subarray with a smaller area can reduce the near field impact on the target device.

FIGS. 2A and 2B are schematic diagrams illustrating near field influence and the subarray division of the reconfigurable panel 120 according to an embodiment of the present disclosure. In FIG. 2A and FIG. 2B, since the total area of the reconfigurable panel is the same, the near field range of the reconfigurable panel itself is the same when the carrier frequency remains unchanged.

In FIG. 2A, the reconfigurable panel 230A is divided into 16 subarrays of 4×4. Therefore, the area of each subarray is smaller, and the near field range formed by each subarray is also smaller. In this case, even if the target device 240A is located closer to the reconfigurable panel 230A, it is still in the far field of the subarray for each subarray. In other words, for the case where the target device is close to the reconfigurable panel, the processing unit 130 can divide the reconfigurable panel 230A into more subarrays, so that each subarray can have a smaller area, and the subarrays with smaller areas can reduce the near field impact on the target device.

In FIG. 2B, the reconfigurable panel 230B is divided into four subarrays of 2×2. Therefore, the area of each subarray is larger, and the near field range formed by each subarray is also larger. In this case, target device 240B needs to be located further from the reconfigurable panel than target device 240A in FIG. 2A to be in the far field of the subarray. In other words, for a target device with a larger distance from the reconfigurable panel as indicated by the subarray division setting information, the processing unit 130 may divide the reconfigurable panel 230B into fewer subarrays, so that each subarray can have a larger area. Since the distance between the target device and the reconfigurable panel 120 is large, even a subarray with a larger area will not cause a significant near field effect on the target device.

The "near field" and "far field" of the reconfigurable panel 120 may be determined according to the specific configuration of the communication system.

Therefore, the processing unit 130 reasonably selects the size of the subarray according to the distance between the target device and the reconfigurable panel, and divides M subarrays, so that the target device is in the far field of a single subarray to solve the problem of large near field range and low gain in the near field range of large-sized RIS based on DFT beamforming.

According to one example of the present disclosure, the processing unit 130 may divide the reconfigurable panel 120 based on the subarray division setting information so that the target device is located in the far field of the divided single subarray. For example, formula (1) can be used to calculate the value range of the corresponding subarray aperture according to the position information of the target device.

$$D^2 < 2\lambda \cdot \alpha \cdot d_{RIS\text{-}Target} \quad (1)$$

Among them, D is the subarray aperture. In the case of a square subarray, D is equal to the length of the diagonal of the square. $\lambda$ is the wavelength of the carrier wave used for communication transmission. $d_{RIS\text{-}Target}$ is the distance between the reconfigurable panel and the target device. $\alpha$ is the scaling coefficient, its typical value is 1, and $\alpha > 0.4$ can also be considered.

For example, in the case where the subarray division setting information includes position information about the target device, the processing unit 130 may determine the distance $d_{RIS\text{-}Target}$ between the target device and the reconfigurable panel 120 according to the received subarray division setting information. The processing unit 130 may then divide the reconfigurable panel 120 into subarrays according to the above formula (1) so that the target device is in the far field of a single subarray. Optionally, when the processing unit 130 divides the reconfigurable panel 120, it may also be based on actual conditions such as the overall size of the reconfigurable panel and limitations of hardware capabilities.

Alternatively, the distance $d_{RIS\text{-}Target}$ between the target device and the reconfigurable panel 120 may be determined by the base station based on position information about the target device, and information indicating the determined distance $d_{RIS\text{-}Target}$ may be sent to the reconfigurable intelligent surface as the subarray division setting information, so that the processing unit 130 performs subarray division based on the subarray division setting information. In addition, the base station can also determine the division manner for the reconfigurable panel 120 according to the distance $d_{RIS\text{-}Target}$ between the target device and the reconfigurable panel 120, and the information indicating the determined division manner may be sent to the reconfigurable intelligent surface as the subarray division setting information, so that the processing unit 130 performs subarray division based on the subarray division setting information.

According to an example of the present disclosure, when dividing into the subarrays, the distance between the target device and the reconfigurable panel may also be logarithmically quantified to determine the subarray size.

FIG. 3 shows an example of values of the subarray size and the distance from the target device to the reconfigurable panel according to an embodiment of the present disclosure.

As shown in FIG. 3, in the case where the carrier frequency is 30 GHz and the scaling factor $\alpha$ is set to 1, when the distance between the target device and the reconfigurable panel is greater than or equal to 2.5 m, a subarray size of less than or equal to 16 cm×16 cm is selected and the maximum number of array elements contained in the subarray is 32×32. When the distance between the target device and the reconfigurable panel is greater than or equal to 10 m, a subarray size of less than or equal to 32 cm×32 cm is selected and the maximum number of array elements contained in the subarray is 64×64. When the distance between the target device and the reconfigurable panel is greater than or equal to 40 m, a subarray size of less than or equal to 64 cm×64 cm is selected and the maximum number of array elements contained in the subarray is 128×128. When the distance between the target device and the reconfigurable panel is greater than or equal to 160 m, a subarray size of less than or equal to 1.3 m×1.3 m is selected and the maximum number of array elements contained in the subarray is 256×256.

In addition, according to another example of the present disclosure, when determining the subarray size and the number of subarrays, other factors may also be considered, such as the processing capability of the reconfigurable intelligent surface, the complexity of system implementation, power consumption, etc.

In addition, in the above description, the example in which the divided subarrays are square subarrays has been described, but the divided subarrays may also be subarrays of other shapes. In addition, the shape of the reconfigurable panel can also be any shape and is not limited to square.

As mentioned above, N subarrays of the M subarrays divided by the reconfigurable panel serve one target device, where N is a positive integer greater than 1 and less than or equal to M.

According to another example of the present disclosure, a reconfigurable intelligent surface may also serve multiple target devices.

Specifically, in the case where the M subarrays divided by the reconfigurable panel serve multiple target devices, if the multiple subarrays that provide services to target device A are set to N1 subarrays, the multiple subarrays that provide services to target device B are set to N2 subarrays, where N1 and N2 are both positive integers and greater than 1, and less than or equal to M.

In this case, the N1 subarrays that provide services to target device A and the N2 subarrays that provide services to target device B may be completely different, completely identical, or part of the subarrays may be the same. In the case where the N1 subarrays that provide services to target device A and the N2 subarrays that provide services to target device B are completely identical or a part of the subarrays are the same, multiplexing can also be achieved through time division or frequency division.

Although the above description shows that the M subarrays divided by the reconfigurable panel serve two target devices, they can also serve more than two target devices.

As mentioned above, the target device may also include one of a terminal and a base station. The above has been described with the terminal as the target device in conjunction with FIG. 2A and FIG. 2B. Alternatively, the base station can also be used as the target device, in which case the subarray division can be performed based on the distance between the base station and the reconfigurable panel.

In particular, when the base station is located in the near field of the reconfigurable panel, the phase difference caused by the spherical wave effect when the beam emitted from the base station reaches the reconfigurable panel needs to be considered. In this case, the reconfigurable intelligent surface can also use the base station as the target device to perform phase compensation for the phase difference when the spherical incident wave reaches the reconfigurable panel. This part will be explained later.

Therefore, the above subarray division may be based on the distance between the terminal and the reconfigurable panel, or may be based on the distance between the base station and the reconfigurable panel.

The "base station" as the target device can also refer to the "beam emitting device in the base station", that is to say, the "distance between the base station and the reconfigurable panel" can also refer to "the distance between the beam emitting device in the base station and the reconfigurable panel". For example, when the reconfigurable panel is located inside a base station, the subarray division can also be performed based on the distance between the beam emitting device in the base station and the reconfigurable panel.

By dividing the reconfigurable panel into M subarrays based on the distance between the target device and the reconfigurable panel, the target device is within the far field range of a single subarray, so that the problem of large near field range and low gain in the near field range of large-sized RIS based on DFT beamforming can be improved. Further, the problem of low gain that a single subarray can provide can be solved by having multiple subarrays serving the same target device.

Thus, even if the target device is within the near field range of a large-scaled RIS based on DFT beamforming, the signal-to-noise ratio of the target device can be improved and the transmission rate of the target device can be improved by having the target device within the far field range of a single subarray and serving the target device through multiple subarrays.

According to an example of the present disclosure, each of the M subarrays divided by the reconfigurable panel corresponds to a specific beam respectively. A specific beam may also be a beam emitted from a corresponding subarray.

According to an example of the present disclosure, the specific beam of each of the N subarrays in the M subarrays divided by the reconfigurable panel is converged on one target device.

Therefore, by converging the specific beam of each of the N subarrays in the M subarrays divided by the reconfigurable panel on the one target device, compared with the solution of irradiating the target device with the specific beam of a single subarray, it is possible to provide higher gain to the specific target device, improve the signal-to-noise ratio, and thus improve the transmission rate.

According to another example of the present disclosure, in the case where M subarrays divided by the reconfigurable panel serve multiple target devices, if the multiple subarrays that provide services to target device A are set to N1 subarrays, the multiple subarrays that provide services to target device B are set to N2 subarrays, where N1 and N2 are both positive integers and greater than 1, and less than or equal to M.

In this case, the specific beam of each of the N1 subarrays that provide services to target device A is converged on one target device, and the specific beam of each of the N2 subarrays that provide services to target device B is converged on another target device.

Although the above description shows that the M subarrays divided by the reconfigurable panel serve two target devices, they can also serve more than two target devices.

In addition, although converging the beam on a specific target device can improve the gain, the covered area after the beam is converged is relatively small. Therefore, once the target device moves, it may leave the covered area, which will cause a larger performance loss. In view of this, according to another embodiment of the present disclosure, the specific beam of each of the N subarrays in the M subarrays may be dispersed within a specific range relative to one target device. The specific range may be determined based on the signal-to-noise ratio required for communication by the target device. For example, when the target device performs high-rate transmission and requires a higher signal-to-noise ratio, the gain is increased by reducing the dispersed range or by converging on the target device without dispersing. On the other hand, when the target device performs low-rate transmission and does not require a higher signal-to-noise ratio, the specific range over which the beam of each of the multiple subarrays serving the target device disperse relative to the target device is increased, thereby enabling a larger range to be covered, improving robustness.

According to another example of the present disclosure, when the reconfigurable panel is relatively close to the base station, the total path loss composed of the path loss between the base station and the reconfigurable panel and the path loss between the target device and the reconfigurable panel is relatively small. Therefore, the signal-to-noise ratio of the target device is sufficient to support high-rate transmission, and there is no need to converge the beam of each of the multiple subarrays that provide services to the target device on the target device to increase the gain. In this case, as described above, the beam of each of the multiple subarrays may be appropriately dispersed to cover a larger range.

According to another example of the present disclosure, the beam of each of a part of the multiple subarrays that provide services to the target device may be converged on the target device, and the beam of each of another part of the multiple subarrays that provide services to the target device may be dispersed relative to the target device, whereby the gain to the target device can be flexibly adjusted according to different required transmission rates.

According to another example of the present disclosure, a communication system with a reconfigurable intelligent surface is also capable of multi-stream transmission. For example, a communication system includes a base station, a reconfigurable intelligent surface, and a terminal. While the base station communicates directly with the terminal, the base station also communicates with the terminal via the reconfigurable intelligent surface to achieve multi-stream transmission.

In the process of multi-stream transmission, in order to improve the efficiency of multi-stream transmission, it is necessary to balance the gain of the direct path where the base station communicates directly with the terminal and the gain of the path where the base station communicates with the terminal via the reconfigurable intelligent surface, and therefore, the efficiency of multi-stream transmission can also be maximized by balancing the gain of the direct path between the base station and the terminal and the path between the base station and the reconfigurable intelligent surface with respect to the inter-subarray codeword selection of the reconfigurable panel in the reconfigurable intelligent surface.

In addition, when the reconfigurable panel serves multiple target devices, the channel quality of different target devices may also be different. Therefore, in order to match the target devices with different channel qualities with the transmission rates, the gains for different target devices may also be adjusted by configuring different subarray sizes and subarray numbers for the different target devices.

The point of the reconfigurable panel serving multiple target devices can also be achieved through orthogonal time division multiplexing, orthogonal frequency division multiplexing, or non-orthogonal (NOMA) waveforms.

Therefore, by configuring different subarray sizes and subarray numbers for different target devices, the gains for different target devices can be adjusted, target devices with different channel qualities can be made to match the transmission rates in the case where the reconfigurable panel serves multiple target devices.

In summary, even if the target device is within the near field range of a large-sized RIS based on DFT beamforming, by having the target device within the far field range of a single subarray and serving that target device through multiple subarrays, the signal-to-noise ratio of the target device can be improved and the transmission rate of the target device can be increased.

In the following, a codebook implementation method for implementing multiple subarrays to serve one target device will be described in detail.

The current DFT-based beamforming manner has the advantages of simple implementation and low signaling consumption. Furthermore, in order to solve the problem of small beam gain of a single subarray, the gain and thus the transmission rate are improved by implementing a dual-layer codebook by first determining a reference DFT beam through a first layer codebook (i.e., a first codebook) and then deflecting and compensating the reference DFT beam through a second layer codebook (i.e., a second codebook) so that the multiple subarrays serve one target device.

Figure 4:
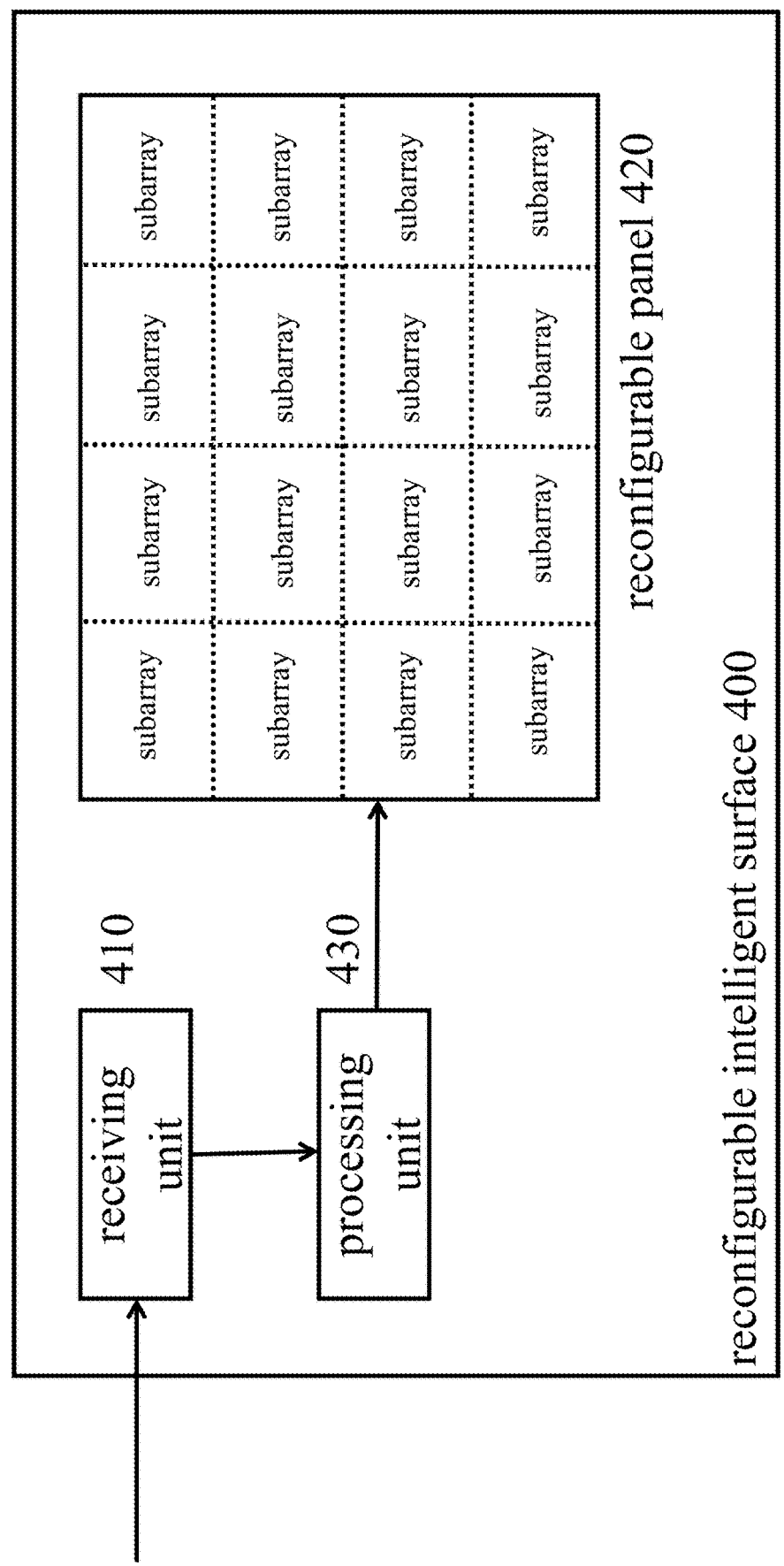
FIG. 4 is a schematic diagram illustrating a reconfigurable intelligent surface according to another embodiment of the present disclosure.

According to one example of the present disclosure, a reconfigurable intelligent surface 400 is provided. As shown in FIG. 4, the reconfigurable intelligent surface 400 comprising: a receiving unit 410 configured to receive position information of a target device; a reconfigurable panel 420; and a processing unit 430 configured to determine a first codebook based on a direction of the reconfigurable panel relative to the target device, and perform calculation on the first codebook based on a distance between the reconfigurable panel and the target device and a position of each subarray in M subarrays included in the reconfigurable panel to determine a second codebook.

The position information may include the direction of the reconfigurable panel relative to the target device, and the distance between the reconfigurable panel and the target device. On the other hand, the position of each subarray of the M subarrays included in the reconfigurable panel may not be included in the position information of the target device received by the receiving unit 410.

The direction of the reconfigurable panel relative to the target device can also be represented by azimuth and elevation.

In addition, the direction of the reconfigurable panel relative to the target device and the distance between the reconfigurable panel and the target device can also be represented by three-dimensional coordinates.

For example, the reconfigurable panel is used as a reference point to represent the position of the target device in the form of three-dimensional coordinates. For another example, the reference point does not necessarily have to be the reconfigurable panel; other positions can also be used as reference points, as long as the positional relationship between the reconfigurable panel and the target device can be clearly expressed.

The position of each subarray of the M subarrays divided by the reconfigurable panel may refer to the position of each subarray of the M subarrays, or may refer to the position of each subarray of multiple subarrays in the M subarrays that serve a certain target device.

According to another example of the present disclosure, the positional information of the target device, the reconfigurable panel, the subarray it contains, etc., can also be represented by other means, for example by means of vectors.

According to an example of the present disclosure, each subarray comprises multiple array elements. The second codebook comprises an array element deflection sub-codebook and a phase compensation sub-codebook, and the array element deflection sub-codebook performs deflection on each array element in the subarray respectively, the phase compensation sub-codebook performs phase compensation on the subarray.

Figure 5:
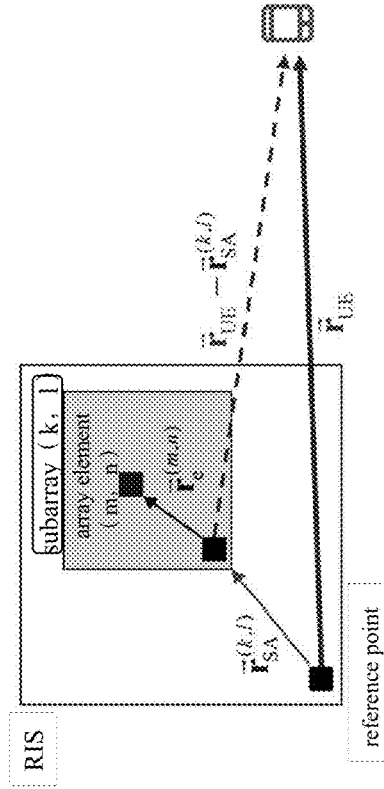
FIG. 5 is a diagram illustrating a double-layer codebook calculation formula according to an embodiment of the present disclosure.

FIG. 5 shows the calculation formula of the double-layer codebook according to the embodiment of the present disclosure. In FIG. 5, for ease of explanation, the terminal is taken as the target device as an example to illustrate the calculation formula of the double-layer codebook. However, the target device can also be set as the base station, and in this case, the position vector TUE of the terminal in FIG. 5 is replaced by the position vector $r_{BS}$ of the base station.

As shown in FIG. 5, the BF emission coefficient of the RIS-UE of the (m, n)th array element of the (k, l)th subarray is determined through the calculation formula of the double-layer codebook. The calculation formula of the double-layer codebook described in FIG. 5 includes a calculation formula for determining the first layer codebook and a calculation formula for determining the second layer codebook.

Based on the direction of the reconfigurable panel relative to the target device, the first layer codebook in FIG. 5 is determined, that is, the reference DFT beam is selected.

Based on the distance between the reconfigurable panel and the target device and the position of each subarray in the M subarrays included in the reconfigurable panel, the first layer codebook is calculated to determine the second layer codebook in FIG. 5.

As shown in FIG. 5, the calculation formula for determining the first layer codebook is related to the position vector of the terminal and the position vector of the (m, n)th array element vector, and the calculation formula for determining the second layer codebook further includes a calculation formula for determining the array element deflection sub-codebook and a calculation formula for determining the phase compensation sub-codebook. The calculation formula for determining the array element deflection sub-codebook includes the vector of the terminal, the position vector of the (k, l)th subarray, and the position vector of the (m, n)th array element, and deflection is performed on each array element in each subarray respectively through the array element deflection sub-codebook. The calculation formula for determining the phase compensation sub-codebook includes the vector of the terminal and the position vector of the (k, l)th subarray, and phase compensation is performed on each subarray through the phase compensation sub-codebook.

According to an example of the present disclosure, the reconfigurable intelligent surface determines the first beam of each subarray through the first codebook, and performs the deflection and the phase compensation on the first beam through the second codebook.

Figure 6:
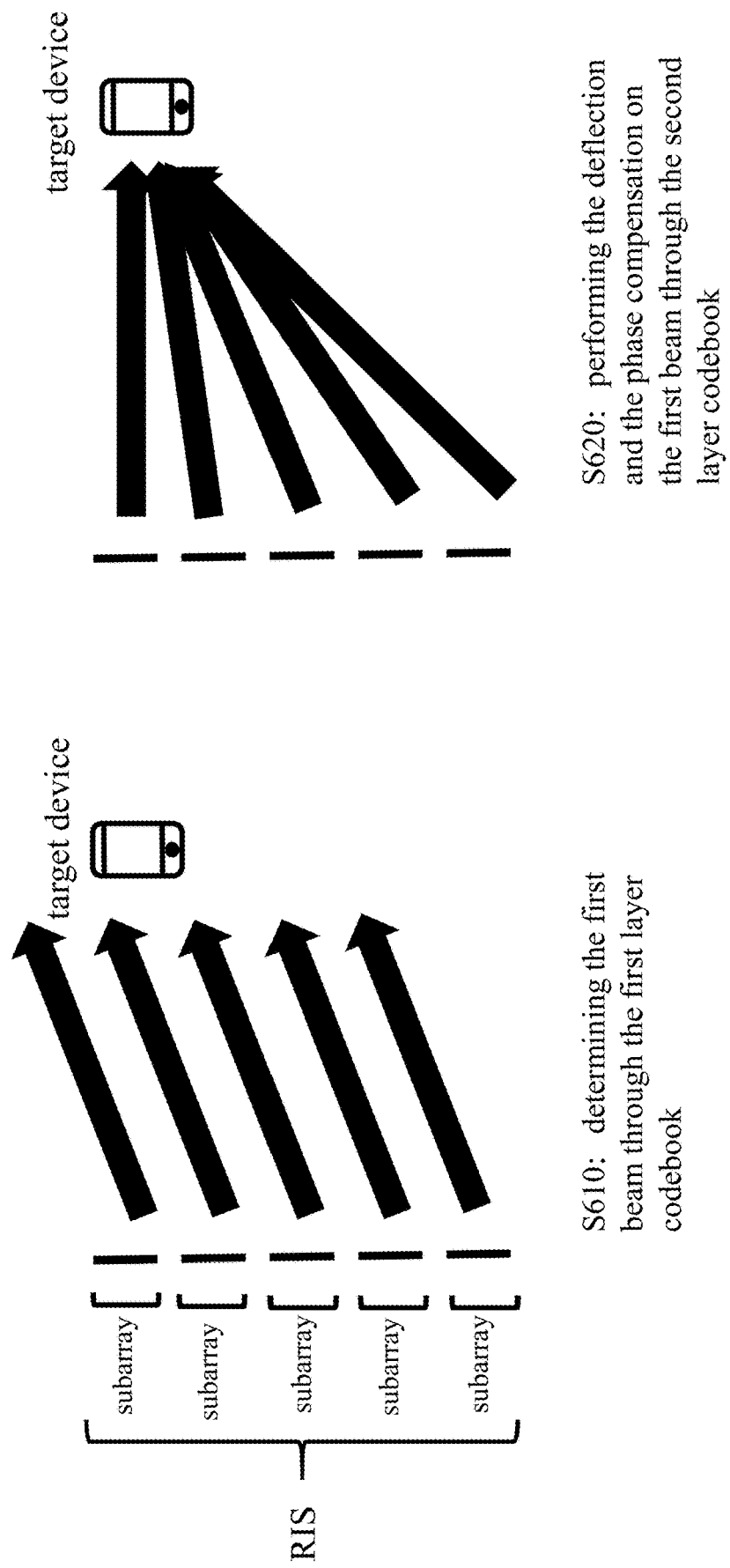
FIG. 6 is a schematic diagram illustrating determining a beam based on a double-layer codebook and performing the deflection and phase compensation on the beam according to an embodiment of the present disclosure.

FIG. 6 is a flowchart illustrating determining a beam based on a double-layer codebook and performing the deflection and phase compensation on the beam according to an embodiment of the present disclosure.

Step S610 in FIG. 6 corresponds to the determination of the first layer codebook in the codebook calculation formula of FIG. 5, that is, determining the reference DFT beam. Step S620 in FIG. 6 corresponds to the determination of the second layer codebook in the codebook calculation formula of FIG. 5, by determining the array element deflection sub-codebook and phase compensation sub-codebook in the second layer codebook shown in FIG. 5, the reference DFT beam is deflected and phase compensated.

In S610, the reconfigurable intelligent surface determines the first beam of each subarray through the first codebook, that is, according to the direction of the reconfigurable panel relative to the target device. The first beam may also be called a reference beam. Since the calculation formula of the first layer codebook in FIG. 5 does not include the position vector of the subarray, but only the position vector of the target device and the position vector of the array element, the direction of the first beam emitted by each subarray is the same.

In S620, each array element in the subarray is deflected respectively through the array element deflection sub-codebook in the second layer codebook, so that the beam emitted by each subarray is converged on the target device. Since the distance between each subarray and the target device is different, in order to offset the phase deviation caused by such distance differences, phase compensation is performed on each subarray through the phase compensation sub-codebook in the second layer codebook to offset the phase deviation of the beam of each subarray when it arrives at the target device.

Here, each array element in the subarray is deflected respectively through the array element deflection sub-codebook in the second layer codebook, so that the first beam emitted from each subarray converges on the target device, providing higher gain to the target device, improving the signal-to-noise ratio, and thus improving the transmission rate, as compared to a scheme in which a beam of a single subarray illuminates the target device.

Alternatively, each array element in the subarray can be deflected respectively through the array element deflection sub-codebook in the second layer codebook, dispersing within a specific range relative to a specific target device. As a result, it can cover a larger range and improve robustness.

According to an example of the present disclosure, the above-mentioned first layer codebook and second layer codebook may also be oversampled to improve beam convergence accuracy. Here, oversampling the codebook can also be interpreted as selecting a beam with better convergence ability from multiple beam candidates to improve the beam convergence accuracy. It is also possible to select a beam from the multiple beam candidates based on hardware conditions of the reconfigurable intelligent surface or other factors.

The oversampling multiple can also be selected to be greater than or equal to 2. For example, there are 4 beam candidates, and 2 beams are selected with an oversampling multiple of 2 times.

The reconfigurable intelligent surface can improve the problem of large near field range and low gain in the near field range of a large-sized RIS based on DFT beamforming by the above-described subarray division when communicating with a terminal. Also, by having multiple subarrays serving the same target device with a double-layer codebook, the problem of lower gain that can be provided by a single subarray can be solved.

According to an example of the present disclosure, the reconfigurable intelligent surface can also perform the above-mentioned similar processing when communicating with the base station.

For example, when the base station is located in the near field of the reconfigurable panel, the phase difference caused by the spherical wave effect when the beam emitted from the base station reaches the reconfigurable panel needs to be considered.

Therefore, when the reconfigurable intelligent surface communicates with the base station, it can also perform the same processing as the subarray division and double-layer codebook when communicating with the terminal to compensate for the phase difference caused by the spherical wave effect when the beam emitted from the base station reaches the reconfigurable panel. In this case, the target device is the base station. Therefore, when dividing into the subarrays and calculating the double-layer codebook, the position of the terminal needs to be replaced by the position of the base station.

In addition, since the position of the base station and the position of the reconfigurable panel are generally fixed in the case where the target device is a base station, the coefficient formula in compensating for the phase difference can be determined by way of calibration in advance when deploying the reconfigurable panel.

Alternatively, before the terminal accesses, the base station may communicate with the reconfigurable intelligent surface, and the reconfigurable intelligent surface reports parameter information of the reconfigurable panel to the base station, such as position, height, angle, size, etc. Then, based on this information, the base station notifies the reconfigurable intelligent surface of the compensation required by the reconfigurable intelligent surface in the form of a codebook. The codebook form can be the same as the calculation formula of the double-layer codebook shown in FIG. 5.

Furthermore, in a communication system including a base station, a reconfigurable intelligent surface, and a terminal, subarray division and double-layer codebook processing can also be performed on the base station and the terminal respectively. That is, with the target device as the base station, using the codebook calculation formula in FIG. 5, subarray division and double-layer codebook processing is performed to obtain the reception coefficient for the RIS-BS end BF, and then with the target device as the terminal, using the codebook calculation formula in FIG. 5, subarray division and double-layer codebook processing is performed to obtain the emission coefficient for RIS-UE end BF. Finally, the reception coefficient used for RIS-BS end BF and the emission coefficient used for RIS-UE end BF are multiplied to obtain the RIS final reflection/transmission coefficient.

In addition, the "base station" as the target device can also refer to the "beam emitting device in the base station", that is to say, the "distance between the base station and the reconfigurable panel" can also refer to "the beam emitting device in the base station and the reconfigurable panel". For example, when the reconfigurable panel is located inside a base station, the above-mentioned subarray division, deflection and phase compensation can also be performed based on the distance between the beam emitting device in the base station and the reconfigurable panel.

Therefore, while improving the problem of large near field range and low terminal gain in the near field range of large-sized RIS based on DFT beamforming, when the base station is located in the near field of the reconfigurable panel, in the case where the phase difference caused by the spherical wave effect when the beam emitted from the base station reaches the reconfigurable panel needs to be considered, it can also compensate the phase difference caused by the spherical wave effect when the beam emitted from the base station reaches the reconfigurable panel.

Therefore, based on the position of each subarray in the M subarrays divided by the reconfigurable panel, the direction of the reconfigurable panel relative to the target device contained in the position information of the target device, and the distance between the reconfigurable panel and the target device, the double-layer codebook can be can determined, thereby providing a new solution for improving the problem of large near field range and low gain in the near field range of large-sized RIS based on DFT beamforming.

The reconfigurable intelligent surface according to the embodiment of the present disclosure has been explained above with reference to FIGS. 1 to 6 and in the above description is described in a manner of being divided into respective units, for example, a receiving unit, a processing unit, and the like, but may be described in a manner of being divided into respective steps, that is, a control method performed by the reconfigurable intelligent surface is described in a manner of a receiving step, a processing step.

Next, the control method performed by the reconfigurable intelligent surface is explained.

Figure 7:
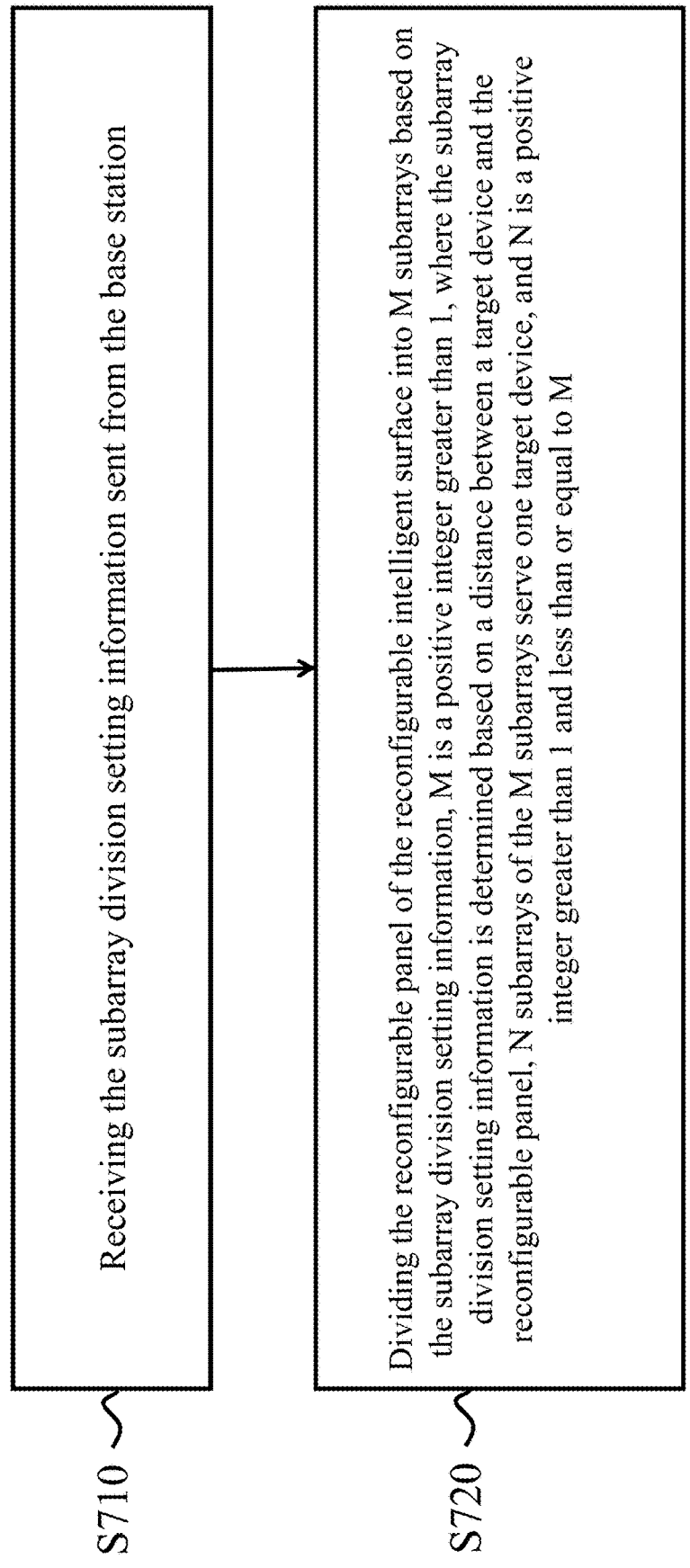
FIG. 7 is a flowchart illustrating a control method performed by the reconfigurable intelligent surface according to an embodiment of the present disclosure.

Next, a control method 700 performed by a reconfigurable intelligent surface according to an embodiment of the present disclosure will be described with reference to FIG. 7. FIG. 7 is a flowchart illustrating a control method 700 performed by a reconfigurable intelligent surface according to an embodiment of the present disclosure.

As shown in FIG. 7, the control method 700 performed by the reconfigurable intelligent surface includes a receiving step 710 and a processing step 720.

Specifically, in the example illustrated in FIG. 7, in the receiving step 710 (S710), the subarray division setting information sent from the base station is received. For example, the subarray division setting information may also be determined based on the distance between the target device and the reconfigurable panel of the reconfigurable intelligent surface. Additionally, specific target devices can be identified as needed. For example, the target device may include one of a terminal and a base station. The target device can be one device or multiple devices. For example, when the target device is a terminal device, the target device may be a terminal device closer to the reconfigurable intelligent surface, or the target device may be multiple terminal devices closer to the reconfigurable intelligent surface.

In processing step 720 (S720), the reconfigurable panel is divided into M subarrays based on the subarray division setting information, where M is a positive integer greater than 1. In an example according to the present disclosure, N subarrays of M subarrays serve one of the target devices, where N is a positive integer greater than 1 and less than or equal to M. In other words, when it is desired to use the reconfigurable intelligent surface, the reconfigurable panel may be divided into multiple subarrays based on the subarray division setting information indicating the distance between the target device and the reconfigurable panel. In addition, in an embodiment according to the present disclosure, other factors, such as hardware constraints, may also be considered when dividing the reconfigurable panel into multiple subarrays. Since the area of a reconfigurable panel is related to its gain. As the area of the reconfigurable panel increases, the gain of the reconfigurable panel also increases. Correspondingly, the near field range of the reconfigurable panel also increases due to the increase in area, and the near field impact on the target device also increases more significant. On the contrary, as the area of the reconfigurable panel decreases, the gain of the reconfigurable panel also decreases. Correspondingly, the near field range of the reconfigurable panel also becomes smaller due to the decrease in area and the near field impact on the target device is mitigated.

Therefore, according to an example of the present disclosure, for a target device with a larger distance from the reconfigurable panel indicated by the subarray division setting information, in the processing step 720, the reconfigurable panel may be divided into fewer subarrays, so that each subarray can have a larger area. Since the distance between the target device and the reconfigurable panel is large, even a subarray with a larger area will not cause significant near field effect on the target device. For the target device with a smaller distance from the reconfigurable panel as indicated by the subarray division setting information, in processing step 720, the reconfigurable panel can be divided into more subarrays, so that each subarray can have smaller area. Since the distance between the target device and the reconfigurable panel is smaller, a subarray with a smaller area can reduce the near field impact on the target device.

As mentioned above, according to an example of the present disclosure, in processing step 720, for the case where the target device is close to the reconfigurable panel, the reconfigurable panel may be divided into more subarrays, so that each subarray may have a smaller area, and the subarray with a smaller area can reduce the near field impact on the target device.

As described above, according to one example of the present disclosure, in processing step 720, for the target device with a larger distance from the reconfigurable panel indicated by the subarray division setting information, the reconfigurable panel may be divided into fewer subarrays, so that each subarray can have a larger area. Since the distance between the target device and the reconfigurable panel is large, even a subarray with a larger area will not cause significant near field effect on the target device.

Therefore, according to an example of the present disclosure, in processing step 720, the size of the subarray is reasonably selected according to the distance between the target device and the reconfigurable panel, and M subarrays are divided, so that the target device is in the far field of a single subarray to solve the problem of large near field range and low gain in the near field range of large-sized RIS based on DFT beamforming.

According to one example of the present disclosure, in processing step 720, the reconfigurable panel may be divided based on the subarray division setting information such that the target device is located in the far field of the divided single subarray.

According to an example of the present disclosure, when dividing into the subarray, the distance between the target device and the reconfigurable panel may also be logarithmically quantified to determine the subarray size.

In addition, according to another example of the present disclosure, when determining the subarray size and the number of subarrays, other factors may also be considered, such as the processing capability of the reconfigurable intelligent surface, the complexity of system implementation, power consumption, etc.

In addition, in the above description, the example in which the divided subarrays are square subarrays has been described, but the divided subarrays may also be subarrays of other shapes. In addition, the shape of the reconfigurable panel can also be any shape and is not limited to square.

As mentioned above, N subarrays of the M subarrays divided by the reconfigurable panel serve one target device, where N is a positive integer greater than 1 and less than or equal to M.

According to another example of the present disclosure, a reconfigurable intelligent surface may also serve multiple target devices.

Alternatively, the base station can also be used as the target device, in which case the subarray division can be performed based on the distance between the base station and the reconfigurable panel.

By dividing the reconfigurable panel into M subarrays based on the distance between the target device and the reconfigurable panel, the target device is within the far field range of a single subarray, so that the problem of large near field range and low gain in the near field range of large-sized RIS based on DFT beamforming can be improved. Further, the problem of low gain that a single subarray can provide can be solved by having multiple subarrays serving the same target device.

Thus, even if the target device is within the near field range of a large-scaled RIS based on DFT beamforming, the signal-to-noise ratio of the target device can be improved and the transmission rate of the target device can be improved by having the target device within the far field range of a single subarray and serving the target device through multiple subarrays.

According to an example of the present disclosure, each of the M subarrays divided by the reconfigurable panel corresponds to a specific beam respectively. A specific beam may also be a beam emitted from a corresponding subarray.

According to an example of the present disclosure, the specific beam of each of the N subarrays in the M subarrays divided by the reconfigurable panel is converged on one target device.

Therefore, by converging the specific beam of each of the N subarrays in the M subarrays divided by the reconfigurable panel on the one target device, compared with the solution of irradiating the target device with the specific beam of a single subarray, it is possible to provide higher gain to the specific target device, improve the signal-to-noise ratio, and thus improve the transmission rate.

According to another example of the present disclosure, in the case where M subarrays divided by the reconfigurable panel serve multiple target devices, if the multiple subarrays that provide services to target device A are set to N1 subarrays, the multiple subarrays that provide services to target device B are set to N2 subarrays, where N1 and N2 are both positive integers and greater than 1, and less than or equal to M.

In this case, the specific beam of each of the N1 subarrays that provide services to target device A is converged on one target device, and the specific beam of each of the N2 subarrays that provide services to target device B is converged on another target device.

Although the above description shows that the M subarrays divided by the reconfigurable panel serve two target devices, they can also serve more than two target devices.

In addition, although converging the beam on a specific target device can improve the gain, the covered area after the beam is converged is relatively small. Therefore, once the target device moves, it may leave the covered area, which will cause a larger performance loss. In view of this, according to another embodiment of the present disclosure, the specific beam of each of the N subarrays in the M subarrays may be dispersed within a specific range relative to one target device. The specific range may be determined based on the signal-to-noise ratio required for communication by the target device. For example, when the target device performs high-rate transmission and requires a higher signal-to-noise ratio, the gain is increased by reducing the dispersed range or by converging on the target device without dispersing. On the other hand, when the target device performs low-rate transmission and does not require a higher signal-to-noise ratio, the specific range over which the beam of each of the multiple subarrays serving the target device disperse relative to the target device is increased, thereby enabling a larger range to be covered, improving robustness.

According to another example of the present disclosure, when the reconfigurable panel is relatively close to the base station, the total path loss composed of the path loss between the base station and the reconfigurable panel and the path loss between the target device and the reconfigurable panel is relatively small. Therefore, the signal-to-noise ratio of the target device is sufficient to support high-rate transmission, and there is no need to converge the beam of each of the multiple subarrays that provide services to the target device on the target device to increase the gain. In this case, as described above, the beam of each of the multiple subarrays may be appropriately dispersed to cover a larger range.

According to another example of the present disclosure, the beam of each of a part of the multiple subarrays that provide services to the target device may be converged on the target device, and the beam of each of another part of the multiple subarrays that provide services to the target device may be dispersed relative to the target device, whereby the gain to the target device can be flexibly adjusted according to different required transmission rates.

According to another example of the present disclosure, a communication system with a reconfigurable intelligent surface is also capable of multi-stream transmission. For example, a communication system includes a base station, a reconfigurable intelligent surface, and a terminal. While the base station communicates directly with the terminal, the base station also communicates with the terminal via the reconfigurable intelligent surface to achieve multi-stream transmission.

In the process of multi-stream transmission, in order to improve the efficiency of multi-stream transmission, it is necessary to balance the gain of the direct path where the base station communicates directly with the terminal and the gain of the path where the base station communicates with the terminal via the reconfigurable intelligent surface, and therefore, the efficiency of multi-stream transmission can also be maximized by balancing the gain of the direct path between the base station and the terminal and the path between the base station and the reconfigurable intelligent surface with respect to the inter-subarray codeword selection of the reconfigurable panel in the reconfigurable intelligent surface.

In addition, when the reconfigurable panel serves multiple target devices, the channel quality of different target devices may also be different. Therefore, in order to match the target devices with different channel qualities with the transmission rates, the gains for different target devices may also be adjusted by configuring different subarray sizes and subarray numbers for the different target devices.

The point of the reconfigurable panel serving multiple target devices can also be achieved through orthogonal time division multiplexing, orthogonal frequency division multiplexing, or non-orthogonal (NOMA) waveforms.

Therefore, by configuring different subarray sizes and subarray numbers for different target devices, the gains for different target devices can be adjusted, target devices with different channel qualities can be made to match the transmission rates in the case where the reconfigurable panel serves multiple target devices.

In summary, even if the target device is within the near field range of a large-sized RIS based on DFT beamforming, by having the target device within the far field range of a single subarray and serving that target device through multiple subarrays, the signal-to-noise ratio of the target device can be improved and the transmission rate of the target device can be increased.

In the following, a codebook implementation method for implementing multiple subarrays to serve one target device will be described in detail.

The current DFT-based beamforming manner has the advantages of simple implementation and low signaling consumption. Furthermore, in order to solve the problem of small beam gain of a single subarray, the gain and thus the transmission rate are improved by implementing a dual-layer codebook by first determining a reference DFT beam through a first layer codebook (i.e., a first codebook) and then deflecting and compensating the reference DFT beam through a second layer codebook (i.e., a second codebook) so that the multiple subarrays serve one target device.

Figure 8:
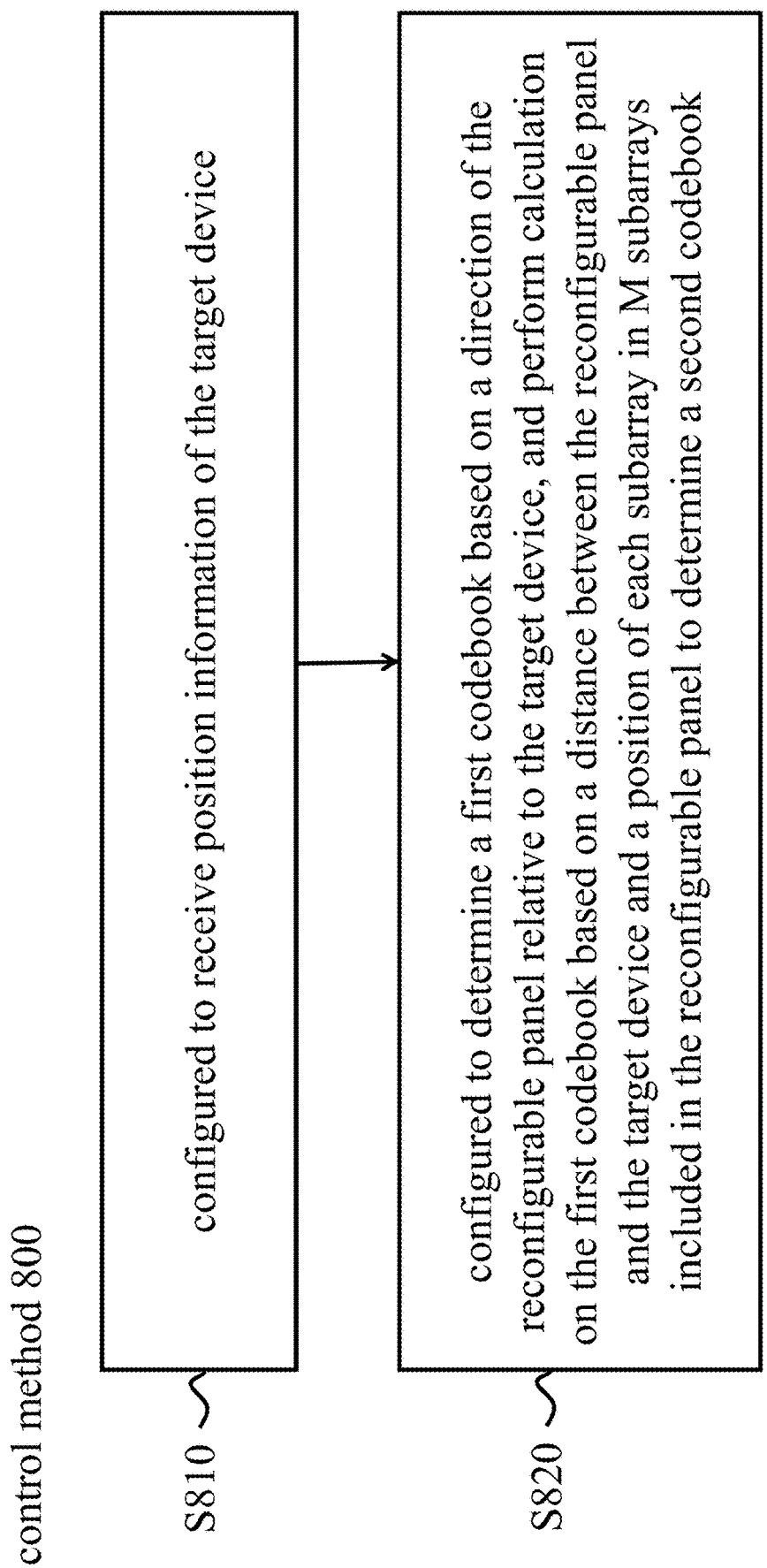
FIG. 8 is a flowchart illustrating a control method performed by a reconfigurable intelligent surface according to another embodiment of the present disclosure.

According to another embodiment of the present disclosure, a control method 800 performed by a reconfigurable intelligent surface is provided. FIG. 8 is a flowchart illustrating a control method 800 performed by a reconfigurable intelligent surface according to another embodiment of the present disclosure.

As shown in FIG. 8, the control method 800 performed by the reconfigurable intelligent surface includes: a receiving step 810 configured to receive position information of the target device; and a processing step 820 configured to determine a first codebook based on a direction of the reconfigurable panel relative to the target device, and perform calculation on the first codebook based on a distance between the reconfigurable panel and the target device and a position of each subarray in M subarrays included in the reconfigurable panel to determine a second codebook.

The position information may include the direction of the reconfigurable panel relative to the target device, and the distance between the reconfigurable panel and the target device. On the other hand, the position of each subarray of the M subarrays included in the reconfigurable panel may not be included in the position information of the target device received in the receiving step 810.

The direction of the reconfigurable panel relative to the target device can also be represented by azimuth and elevation.

In addition, the direction of the reconfigurable panel relative to the target device and the distance between the reconfigurable panel and the target device can also be represented by three-dimensional coordinates.

For example, the reconfigurable panel is used as a reference point to represent the position of the target device in the form of three-dimensional coordinates. For another example, the reference point does not necessarily have to be the reconfigurable panel; other positions can also be used as reference points, as long as the positional relationship between the reconfigurable panel and the target device can be clearly expressed.

The position of each subarray of the M subarrays divided by the reconfigurable panel may refer to the position of each subarray of the M subarrays, or may refer to the position of each subarray of multiple subarrays in the M subarrays that serve a certain target device.

According to another example of the present disclosure, the positional information of the target device, the reconfigurable panel, the subarray it contains, etc., can also be represented by other means, for example by means of vectors.

According to an example of the present disclosure, each subarray comprises multiple array elements. The second codebook comprises an array element deflection sub-codebook and a phase compensation sub-codebook, and the array element deflection sub-codebook performs deflection on each array element in the subarray respectively, the phase compensation sub-codebook performs phase compensation on the subarray.

According to an example of the present disclosure, the reconfigurable intelligent surface determines the first beam of each subarray through the first codebook, and performs the deflection and the phase compensation on the first beam through the second codebook.

As described above, the reconfigurable intelligent surface determines the first beam of each subarray through the first codebook, that is, according to the direction of the reconfigurable panel relative to the target device. The first beam may also be called a reference beam. Since the calculation formula of the first layer codebook in FIG. 5 does not include the position vector of the subarray, but only the position vector of the target device and the position vector of the array element, the direction of the first beam emitted by each subarray is the same.

Each array element in the subarray is deflected respectively through the array element deflection sub-codebook in the second layer codebook, so that the beam emitted by each subarray is converged on the target device. Since the distance between each subarray and the target device is different, in order to offset the phase deviation caused by such distance differences, phase compensation is performed on each subarray through the phase compensation sub-codebook in the second layer codebook to offset the phase deviation of the beam of each subarray when it arrives at the target device.

Here, each array element in the subarray is deflected respectively through the array element deflection sub-codebook in the second layer codebook, so that the first beam emitted from each subarray converges on the target device, providing higher gain to the target device, improving the signal-to-noise ratio, and thus improving the transmission rate, as compared to a scheme in which a beam of a single subarray illuminates the target device.

Alternatively, each array element in the subarray can be deflected respectively through the array element deflection sub-codebook in the second layer codebook, dispersing within a specific range relative to a specific target device. As a result, it can cover a larger range and improve robustness.

According to an example of the present disclosure, the above-mentioned first layer codebook and second layer codebook may also be oversampled to improve beam convergence accuracy. Here, oversampling the codebook can also be interpreted as selecting a beam with better convergence ability from multiple beam candidates to improve the beam convergence accuracy. It is also possible to select a beam from the multiple beam candidates based on hardware conditions of the reconfigurable intelligent surface or other factors.

The oversampling multiple can also be selected to be greater than or equal to 2. For example, there are 4 beam candidates, and 2 beams are selected with an oversampling multiple of 2 times.

The reconfigurable intelligent surface can improve the problem of large near field range and low gain in the near field range of a large-sized RIS based on DFT beamforming by the above-described subarray division when communicating with a terminal. Also, by having multiple subarrays serving the same target device with a double-layer codebook, the problem of lower gain that can be provided by a single subarray can be solved.

According to an example of the present disclosure, the reconfigurable intelligent surface can also perform the above-mentioned similar processing when communicating with the base station.

For example, when the base station is located in the near field of the reconfigurable panel, the phase difference caused by the spherical wave effect when the beam emitted from the base station reaches the reconfigurable panel needs to be considered.

Therefore, when the reconfigurable intelligent surface communicates with the base station, it can also perform the same processing as the subarray division and double-layer codebook when communicating with the terminal to compensate for the phase difference caused by the spherical wave effect when the beam emitted from the base station reaches the reconfigurable panel. In this case, the target device is the base station. Therefore, when dividing into the subarrays and calculating the double-layer codebook, the position of the terminal needs to be replaced by the position of the base station.

In addition, since the position of the base station and the position of the reconfigurable panel are generally fixed in the case where the target device is a base station, the coefficient formula in compensating for the phase difference can be determined by way of calibration in advance when deploying the reconfigurable panel.

Alternatively, before the terminal accesses, the base station may communicate with the reconfigurable intelligent surface, and the reconfigurable intelligent surface reports parameter information of the reconfigurable panel to the base station, such as position, height, angle, size, etc. Then, based on this information, the base station notifies the reconfigurable intelligent surface of the compensation required by the reconfigurable intelligent surface in the form of a codebook. The codebook form can be the same as the calculation formula of the double-layer codebook shown in FIG. 5.

Furthermore, in a communication system including a base station, a reconfigurable intelligent surface, and a terminal, subarray division and double-layer codebook processing can also be performed on the base station and the terminal respectively. That is, with the target device as the base station, using the codebook calculation formula in FIG. 5, subarray division and double-layer codebook processing is performed to obtain the reception coefficient for the RIS-BS end BF, and then with the target device as the terminal, using the codebook calculation formula in FIG. 5, subarray division and double-layer codebook processing is performed to obtain the emission coefficient for RIS-UE end BF. Finally, the reception coefficient used for RIS-BS end BF and the emission coefficient used for RIS-UE end BF are multiplied to obtain the RIS final reflection/transmission coefficient.

In addition, the "base station" as the target device can also refer to the "beam emitting device in the base station", that is to say, the "distance between the base station and the reconfigurable panel" can also refer to "the beam emitting device in the base station and the reconfigurable panel". For example, when the reconfigurable panel is located inside a base station, the above-mentioned subarray division, deflection and phase compensation can also be performed based on the distance between the beam emitting device in the base station and the reconfigurable panel.

Therefore, while improving the problem of large near field range and low terminal gain in the near field range of large-sized RIS based on DFT beamforming, when the base station is located in the near field of the reconfigurable panel, in the case where the phase difference caused by the spherical wave effect when the beam emitted from the base station reaches the reconfigurable panel needs to be considered, it can also compensate the phase difference caused by the spherical wave effect when the beam emitted from the base station reaches the reconfigurable panel.

Therefore, based on the position of each subarray in the M subarrays divided by the reconfigurable panel, the direction of the reconfigurable panel relative to the target device contained in the position information of the target device, and the distance between the reconfigurable panel and the target device, the double-layer codebook can be can determined, thereby providing a new solution for improving the problem of large near field range and low gain in the near field range of large-sized RIS based on DFT beamforming.

<Hardware Structure>

In addition, block diagrams used in the description of the above embodiments illustrate blocks in units of functions. These functional blocks (structural blocks) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g. wired and/or wirelessly), and the respective functional blocks may be implemented by these apparatuses.

Figure 9:
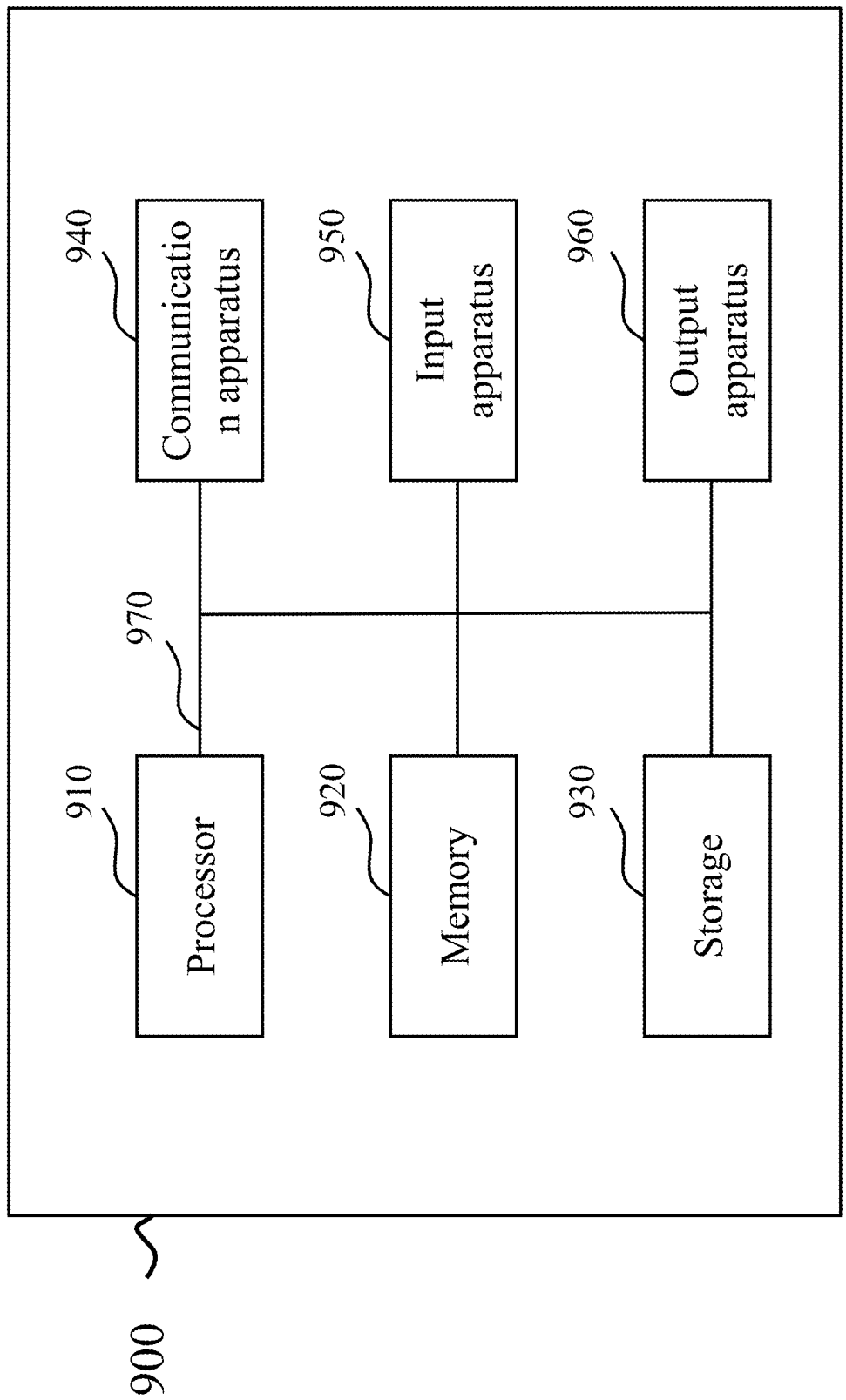
FIG. 9 is a schematic diagram illustrating the hardware structure of a device according to an embodiment of the present disclosure.

For example, the device (such as a terminal, a base station, or the like) in an embodiment of the present disclosure may function as a computer that executes the processes of the wireless communication method of the present disclosure. FIG. 9 is a schematic diagram of a hardware structure of a device 900 involved in an embodiment of the present disclosure. The above device 900 may be constituted as a computer apparatus that physically comprises a processor 910, a memory 920, a storage 930, a communication apparatus 940, an input apparatus 950, an output apparatus 960, a bus 970 and the like In addition, in the following description, terms such as "apparatus" may be replaced with circuits, devices, units, and the like. The hardware structure of the device may include one or more of the respective apparatuses shown in the figure, or may not include a part of the apparatuses.

For example, only one processor 910 is illustrated, but there may be multiple processors. Furthermore, processes may be performed by one processor, or processes may be performed by more than one processor simultaneously, sequentially, or with other methods. In addition, the processor 910 may be installed by more than one chip.

Respective functions of any of the device 900 may be implemented, for example, by reading specified software (program) on hardware such as the processor 910 and the memory 920, so that the processor 910 performs computations, controls communication performed by the communication apparatus 940, and controls reading and/or writing of data in the memory 920 and the storage 930.

The processor 910, for example, operates an operating system to control the entire computer. The processor 910 may be constituted by a Central Processing Unit (CPU), which includes interfaces with peripheral apparatuses, a control apparatus, a computing apparatus, a register and the like. For example, the processing unit described above may be implemented by the processor 910.

In addition, the processor 910 reads programs (program codes), software modules and data and the like from the storage 930 and/or the communication apparatus 940 to the memory 920, and execute various processes according to them. As for the program, a program causing computers to execute at least a part of the operations described in the above embodiments may be employed. For example, the processing unit of the device may be implemented by a control program stored in the memory 920 and operated by the processor 910, and other functional blocks may also be implemented similarly.

The memory 920 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 920 may also be referred to as a register, a cache, a main memory (a main storage apparatus) and the like. The memory 920 may store executable programs (program codes), software modules and the like for implementing a method involved in an embodiment of the present disclosure.

The storage 930 is a computer-readable recording medium, and may be constituted, for example, by at least one of a flexible disk, a Floppy® disk, a magneto-optical disk (e.g., a Compact Disc ROM (CD-ROM) and the like, a digital versatile disk, a Blu-ray® disk), a removable disk, a hard driver, a smart card, a flash memory device (e.g., a card, a stick and a key driver), a magnetic stripe, a database, a server, and other appropriate storage media. The storage 930 may also be referred to as an auxiliary storage apparatus.

The communication apparatus 940 is a hardware (transceiver device) performing communication between computers via a wired and/or wireless network, and is also referred to as a network device, a network controller, a network card, a communication module and the like, for example. The communication apparatus 940 may include a high-frequency switch, a duplexer, a filter, a frequency synthesizer and the like to implement, for example, Frequency Division Duplex (FDD) and/or Time Division Duplex (TDD). For example, the transmitting unit, the receiving unit and the like described above may be implemented by the communication apparatus 940.

The input apparatus 950 is an input device (e.g., a keyboard, a mouse, a microphone, a switch, a button, a sensor and the like) that receives input from the outside. The output apparatus 960 is an output device (e.g., a display, a speaker, a Light Emitting Diode (LED) light and the like) that performs outputting to the outside. In addition, the input apparatus 950 and the output apparatus 960 may also be an integrated structure (e.g., a touch screen).

Furthermore, the respective apparatuses such as the processor 910 and the memory 920 are connected by the bus 970 that communicates information. The bus 970 may be constituted by a single bus or by different buses between the apparatuses.

Furthermore, the terminal may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 910 may be installed by at least one of these hardware.

(Variations)

In addition, terms illustrated in the present specification and/or terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a pilot, a pilot signal and so on, depending on the standard applied. Furthermore, a component carrier (CC) may also be referred to as a cell, a frequency carrier, a carrier frequency, and the like.

Furthermore, information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

Names used for parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limitative in any respect.

Information, signals and the like described in this specification may be represented by using any of a variety of different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

Information, signals and the like that are input or output may be stored in a specific location (for example, in a memory), or may be managed in a management table. Information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, Downlink Control Information (DCI), Uplink Control Information (UCI)), higher layer signaling (for example, Radio Resource Control (RRC) signaling, broadcast information (Master Information Blocks (MIBs), System Information Blocks (SIBs), etc.), Medium Access Control (MAC) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as RRC messages, for example, RRC connection setup messages, RRC connection reconfiguration messages, and so on. Furthermore, MAC signaling may be reported by using, for example, MAC Control Elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. A base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, a wireless base station in this specification may also be replaced with a user terminal. For example, for a structure in which communication between a wireless base station and a user terminal is replaced with communication between a plurality of user terminals (Device-to-Device, D2D), the respective manners/embodiments of the present disclosure may also be applied. In this case, the function provided by the first communication device or the second communication device of the above-described device 900 may be regarded as functions provided by a user terminal. Furthermore, the words "uplink" and "downlink" may also be replaced with "side". For example, an uplink channel may be replaced with a side channel.

Also, a user terminal in this specification may be replaced with a wireless base station. In this case, functions provided by the above user terminal may be regarded as functions provided by a first communication device and a second communication device.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched to use during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize Long Term Evolution (LTE), Advanced Long Term Evolution (LTE-A, LTE-Advanced), Beyond Long Term Evolution (LTE-B, LTE-Beyond), the super 3rd generation mobile communication system (SUPER 3G), Advanced International Mobile Telecommunications (IMT-Advanced), the 4th generation mobile communication system (4G), the 5th generation mobile communication system (5G), Future Radio Access (FRA), New Radio Access Technology (New-RAT), New Radio (NR), New radio access (NX), Future generation radio access (FX), Global System for Mobile communications (GSM® R), Code Division Multiple Access 3000 (CDMA 3000), Ultra Mobile Broadband (UMB), IEEE 920.11 (Wi-Fi®), IEEE 920.16 (WiMAX®), IEEE 920.20, Ultra-Wide Band (UWB), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting, accessing (e.g., accessing data in a memory), etc. as performing the "deciding (determining)". In addition, the "deciding (determining)" may further regard resolving, selecting, choosing, establishing, comparing, etc. as performing the "deciding (determining)". That is, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described above in detail, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

The invention claimed is:

1. A reconfigurable intelligent surface, comprising:
a receiving unit which receives subarray division setting information sent from a base station;
a reconfigurable panel; and
a processing unit, which divides, based on the subarray division setting information, the reconfigurable panel into M subarrays, where M is a positive integer greater than 1,
wherein, the subarray division setting information is determined based on a distance between a target device and the reconfigurable panel,
N subarrays of the M subarrays serve one target device, and N is a positive integer greater than 1 and less than or equal to M,
wherein, each of the M subarrays corresponds to a specific beam respectively.

2. The reconfigurable intelligent surface of claim 1, wherein, the specific beam of each of the N subarrays in the M subarrays is converged on the one target device.

3. The reconfigurable intelligent surface of claim 1, wherein the specific beam of each of the N subarrays in the M subarrays is dispersed within a specific range relative to the one target device.

4. The reconfigurable intelligent surface of claim 1, wherein,
the M subarrays serve multiple target devices,
a number of subarrays serving each of the target devices is a positive integer, and the number of subarrays is greater than 1 and less than or equal to M.

5. A reconfigurable intelligent surface, comprising:
a receiving unit configured to receive position information of a target device;
a reconfigurable panel; and
a processing unit configured to determine a first codebook based on a direction of the reconfigurable panel relative to the target device, and perform calculation on the first codebook based on a distance between the reconfigurable panel and the target device and a position of each subarray in M subarrays included in the reconfigurable panel to determine a second codebook,
wherein, the M is a positive integer greater than 1,
wherein, the reconfigurable intelligent surface determines a first beam of the each subarray through the first codebook.

6. The reconfigurable intelligent surface of claim 5, wherein
each of the subarrays comprises multiple array elements,
the second codebook comprises an array element deflection sub-codebook and a phase compensation sub-codebook,
the array element deflection sub-codebook performs deflection on each array element in the subarray respectively,
the phase compensation sub-codebook performs phase compensation on the subarray.

7. The reconfigurable intelligent surface of claim 6, wherein the reconfigurable intelligent surface performs the deflection and the phase compensation on the first beam through the second codebook.

8. The reconfigurable intelligent surface of claim 5, wherein the target device comprises at least one of a terminal and a base station.

9. The reconfigurable intelligent surface of claim 5, wherein the reconfigurable intelligent surface oversamples the first codebook and the second codebook.

\* \* \* \* \*